United States Patent [19]

Inagaki et al.

[11] Patent Number: 5,745,283

[45] Date of Patent: Apr. 28, 1998

[54] METHOD AND APPARATUS FOR CONTROLLING OPTICAL AMPLIFIER USED FOR OPTICALLY AMPLIFYING WAVELENGTH-DIVISION MULTIPLEXED SIGNAL

[75] Inventors: Shinya Inagaki; Kenji Tagawa, both of Kawaski; Norifumi Shukunami, Sapporo; Nobuhiro Fukushima, Kawasaki, all of Japan

[73] Assignee: Fujitsu Limited, Kawasaki, Japan

[21] Appl. No.: 697,252

[22] Filed: Aug. 21, 1996

[30] Foreign Application Priority Data

Aug. 23, 1995 [JP] Japan .................................. 7-214602
Nov. 21, 1995 [JP] Japan .................................. 7-302907

[51] Int. Cl.$^6$ .................................................. H01S 3/00
[52] U.S. Cl. .................................................. 359/341
[58] Field of Search .................... 359/341, 337; 372/6

[56] References Cited

U.S. PATENT DOCUMENTS

| | | | |
|---|---|---|---|
| 5,111,334 | 5/1992 | Heidemann | 359/341 |
| 5,239,607 | 8/1993 | da Silva et al. | 385/122 |
| 5,396,360 | 3/1995 | Majima | 359/133 |
| 5,436,760 | 7/1995 | Nakabayashi | 359/341 |
| 5,500,764 | 3/1996 | Armitage et al. | 359/341 |
| 5,506,724 | 4/1996 | Ghimizu et al. | 359/341 |
| 5,521,753 | 5/1996 | Fake et al. | 359/341 |
| 5,530,583 | 6/1996 | Uno et al. | 359/341 |
| 5,546,221 | 8/1996 | Harasawa | 359/341 |
| 5,561,552 | 10/1996 | Shibuya | 359/341 |
| 5,581,397 | 12/1996 | Maki et al. | 359/341 |
| 5,633,750 | 5/1997 | Nogiwa et al. | 359/341 |

FOREIGN PATENT DOCUMENTS

| | | |
|---|---|---|
| 3-089644 | 4/1991 | Japan . |
| 4-275530 | 10/1992 | Japan . |
| 5-037472 | 2/1993 | Japan . |
| 5-110511 | 4/1993 | Japan . |
| 92/02061 | 2/1992 | WIPO . |

OTHER PUBLICATIONS

U.S. application No. 08/508,471, Fujitsu Limited, filed Jul. 28, 1995.

Delavaux et al., "Hybrid Er-Doped Fibre Amplifiers at 980-1480 nm for Long Distance Optical Communications," *Electronics Letters*, vol. 28, No. 17, Aug. 13, 1992, XP 000315887, 2 pages.

Motoshima et al., "Dynamic Compensation of Transient Gain Saturation in Erbium-Doped Fiber Amplifiers by Pump Feedback Control," *IEEE Photonics Technology Letters*, vol. 5, No. 12, Dec. 1993, XP 000432990, pp. 1423-1426.

*Patent Abstracts of Japan*, vol. 95, No. 11, Dec. 26, 1995 & JP-A-07-202306 (NEC Corp.), Aug. 4, 1995, "Optical Fiber Amplifier for Wavelength Multiplex Transmission."

*Primary Examiner*—Mark Hellner
*Attorney, Agent, or Firm*—Staas & Halsey

[57] ABSTRACT

A method and apparatus for controlling gain differences between optical signals, and hence an output of each individual optical signal, in an optical amplifier including a rare-earth-doped fiber for optically amplifying a wavelength-division multiplexed signal. Pumping light is injected into an erbium-doped fiber that is also supplied with additional pumping light that gives a different gain characteristic to the erbium-doped fiber. The output of each signal light is detected by a photodetector and, based on the detected output, injection power is controlled individually for each pumping light.

26 Claims, 6 Drawing Sheets

METHOD AND APPARATUS FOR CONTROLLING OPTICAL AMPLIFIER USED FOR OPTICALLY AMPLIFYING WAVELENGTH-DIVISION MULTIPLEXED SIGNAL

BACKGROUND OF THE INVENTION

1. Field of the Invention

The present invention relates to a method and apparatus for controlling an optical amplifier containing a rare-earth-doped fiber for optically amplifying a wavelength-division multiplexed signal.

2. Description of the Related Art

Optical amplification systems using erbium-doped optical-fiber amplifiers have already been put to practical use, and to further increase transmission speed, developers are working toward the practical implementation of a multiple-wavelength simultaneous amplification system for wavelength-division multiplexed transmissions of multiple signals at different wavelengths through an optical transmission path including an optical amplifier. An optical amplifier for such a system is required to have the function of controlling gains at multiple signal wavelengths. Usually, for a single waveform, this could be accomplished by controlling pumping light, but in the case of multiple-wavelength simultaneous amplification, not only controlling pumping light but controlling gain differences between multiple signals also becomes necessary in order to control the gain of each individual signal.

U.S. Ser. No. 508,471 (filed on Jul. 28, 1995) proposes a method in which two pumping lights, one in the 0.98-μm band and the other in the 1.48-μm band, giving complementary gain characteristics (the relationship between signal light wavelength and gain), are simultaneously applied, attempting to achieve a flat gain characteristic and thereby reducing the gain difference between two signal wavelengths. However, no suggestions are made about controlling the gain difference and hence controlling the output of each individual optical signal.

SUMMARY OF THE INVENTION

It is an object of the present invention to provide a method and apparatus for controlling gain differences between optical signals, and hence an output of each individual optical signal, in an optical amplifier used to optically amplify a wavelength-division multiplexed signal.

According to the present invention, there is provided a method of controlling an optical amplifier including a rare-earth-doped fiber for optically amplifying a wavelength-division multiplexed signal carrying a plurality of optical signals at different wavelengths, comprising the steps of: injecting first pumping light into the rare-earth-doped fiber; injecting second pumping light into the rare-earth-doped fiber, the second pumping light giving a different gain characteristic to the rare-earth-doped fiber from a gain characteristic that the first pumping light gives; and controlling an injection power for at least one of the first pumping light and the second pumping light.

According to the present invention, there is also provided a method of controlling an optical amplifier including a rare-earth-doped fiber for optically amplifying a wavelength-division multiplexed signal carrying a plurality of optical signals at different wavelengths, comprising the steps of: injecting control light into the rare-earth-doped fiber, the control light being at a wavelength within a wavelength region where the rare-earth-doped fiber exhibits an optical amplification effect; and controlling the power or wavelength of the control light to be injected, thereby controlling a gain difference between the plurality of optical signals.

According to the present invention, there is also provided an apparatus for controlling an optical amplifier including a rare-earth-doped fiber for optically amplifying a wavelength-division multiplexed signal carrying a plurality of optical signals at different wavelengths, comprising: means for injecting first pumping light into the rare-earth-doped fiber; means for injecting second pumping light into the rare-earth-doped fiber, the second pumping light giving a different gain characteristic to the rare-earth-doped fiber from a gain characteristic that the first pumping light gives; and means for controlling an injection power for at least either one of the first and the second pumping light.

According to the present invention, there is also provided an apparatus for controlling an optical amplifier including a rare-earth-doped fiber for optically amplifying a wavelength-division multiplexed signal carrying a plurality of optical signals at different wavelengths, comprising: means for injecting control light into the rare-earth-doped fiber, the control light being at a wavelength within a wavelength region where the rare-earth-doped fiber exhibits an optical amplification effect; and means for controlling the power or wavelength of the control light to be injected, thereby controlling a gain difference between the plurality of optical signals.

DESCRIPTION OF THE PREFERRED EMBODIMENTS

Figure 1:
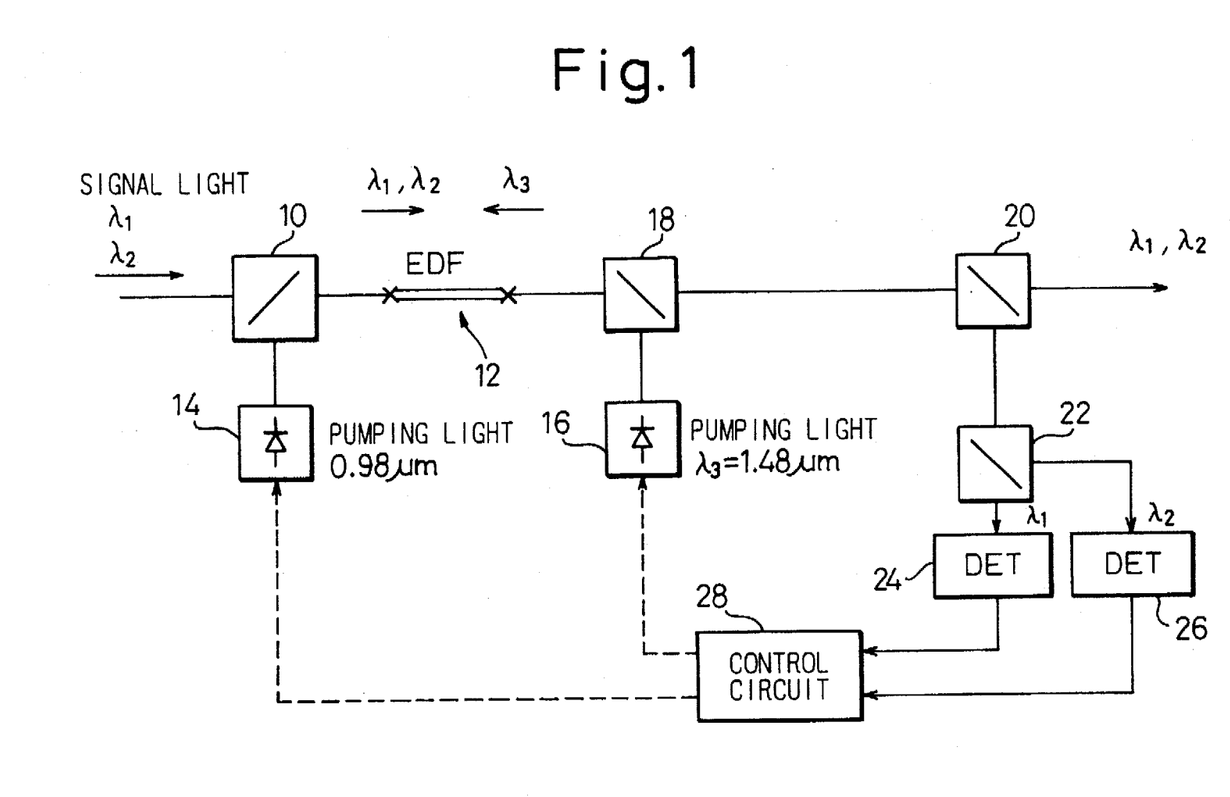
FIG. 1 is a block diagram showing a first embodiment of the present invention.

FIG. 1 shows the configuration of an optical amplifier to which control according to a first embodiment of the invention is applied. In FIG. 1, signal light consisting of two different wavelengths, $\lambda_1$ and $\lambda_2$ ($\lambda_1 < \lambda_2$), is combined in a beam combiner (optical coupler) 10 with pumping light (for example, at 0.98 μm wavelength) from a light source 14, and enters an erbium-doped fiber ("EDF") 12. Pumping light from a light source 16 emitting at wavelength $\lambda_3$ (for example, $\lambda_3 = 1.48$ μm) is introduced by a beam combiner (optical coupler) 18 into the erbium-doped fiber 12 in the direction opposite to the direction of the signal light. Some of the signal light amplified through the erbium-doped fiber 12 is separated by an optical coupler 20 and enters a beam splitter 22 where the light is split into wavelengths $\lambda_1$ and $\lambda_2$, whose optical powers are detected by photodetectors 24 and 26, respectively. Based on the detection outputs from the photodetectors 24 and 26, a control circuit 28 controls drive currents to the light sources 14 and 16, thus controlling the optical power.

Figure 2:
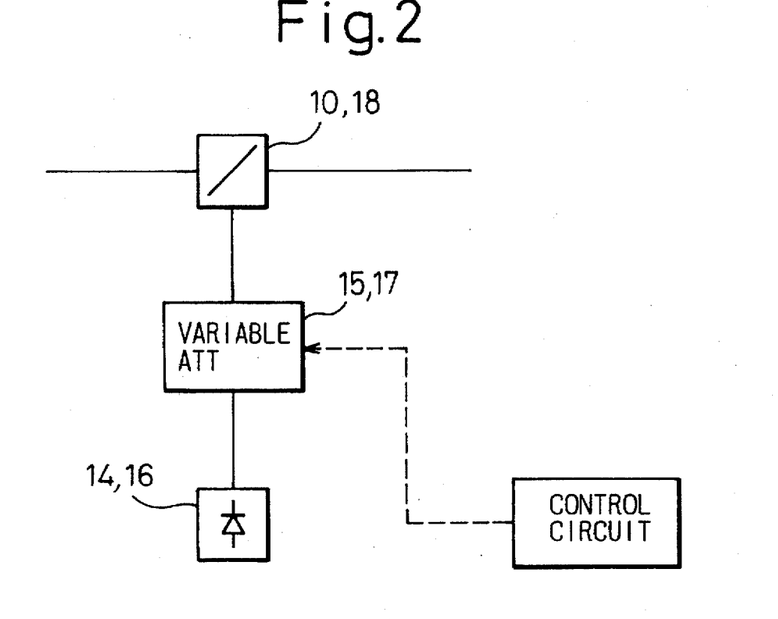
FIG. 2 is a block diagram showing a modified example of the first embodiment of the present invention.

It will be appreciated that the injection direction of each pumping light is not limited to that shown in the illustrated example. Further, instead of controlling the drive currents to the light sources 14 and 16 to control the injection powers of the respective pumping lights, variable attenuators 15 and 17 may be provided between the light source 14, 16 and the beam combiners 10, 18, as shown in FIG. 2, and the degree of attenuation in the variable attenuators 15 and 17 may be controlled to control the injection powers of the pumping lights.

As shown in FIG. 15 of Japanese Patent Application No. 6-229164, with the pumping light in the 0.98-μm band, the gain is higher at the shorter wavelength than at the longer wavelength, whereas with the pumping light in the 1.48-μm band, the gain is higher at the longer wavelength than at the shorter wavelength. The control circuit 28 calculates optical outputs at $\lambda_1$ and $\lambda_2$ from the outputs of the photodetectors 24 and 26 and, if the optical output power $P_1$ at the shorter wavelength $\lambda_1$ is larger than the optical output power $P_2$ at the longer wavelength $\lambda_2$, it reduces the power of the 0.98-μm pumping light that is contributing to a higher gain at the shorter wavelength and increases the power of the 1.48-μm pumping light that has the effect of increasing the gain at the shorter wavelength. Conversely, if $P_2$ is larger than $P_1$, the power of the 1.48-μm pumping light is reduced while the power of the 0.98-μm pumping light is increased. Furthermore, if the combined optical output power of the two optical signals is smaller than a desired output power, the pumping light powers in both the 0.98-μm and 1.48-μm bands are raised and, if the combined optical output power is larger than the predetermined output power, both pumping light powers are reduced so that the desired optical output can be obtained.

As described, according to the first embodiment of the invention, the pumping light powers in the 0.98-μm and 1.48-μm bands are adjusted while monitoring the output of each optical signal so that the desired output can be obtained for each optical signal.

Figure 3:
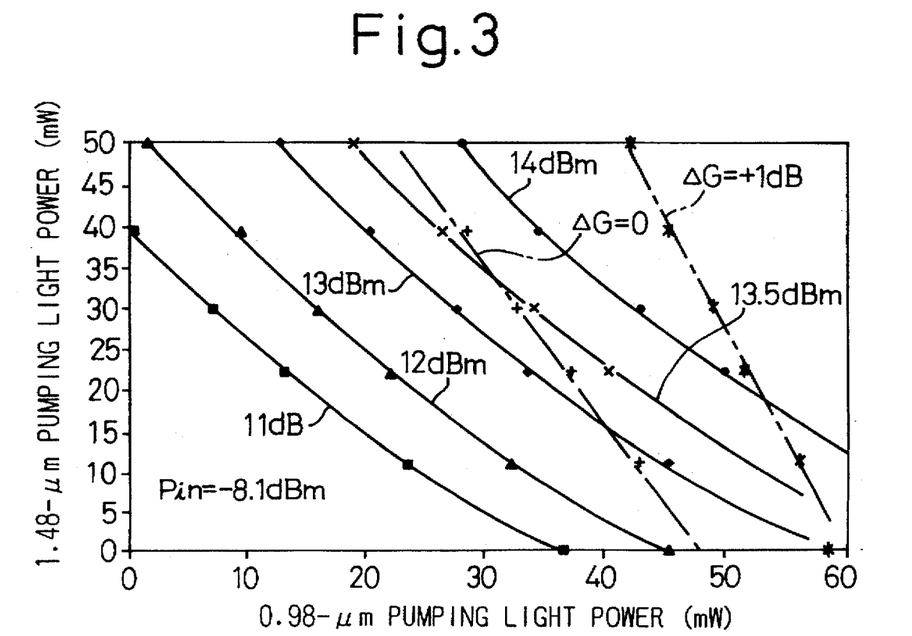
FIG. 3 is a graph for explaining the operation of the circuit shown in FIG. 1.

FIG. 3 shows the results of an experiment conducted with each input signal optical power at −8.1 dBm and input signal light wavelengths at $\lambda_1$=1535 nm and $\lambda_2$=1558 nm. In FIG. 3, the relationship between the 0.98-μm pumping light power and 1.48-μm pumping light power is shown for a constant gain difference ΔG (=$P_{1558}-P_{1535}$) at 0 and at +1 dB, and a constant total output (=$P_{1558}+P_{1535}$) at 11, 12, 13, and 13.5 dBm. For example, it is shown that for ΔG=0, a total output of 13 dBm is obtained when the 0.98-μm and 1.48-μm pumping light powers are set at 40 mW and 15 mW, respectively, and a total output of 13.5 dBm at 30 mW and 35 mW. In this way, by varying the 0.98-μm pumping light power and 1.48-μm pumping light power along the curve of ΔG=0, the optical output can be varied while maintaining the gain difference constant at 0.

Figure 4:
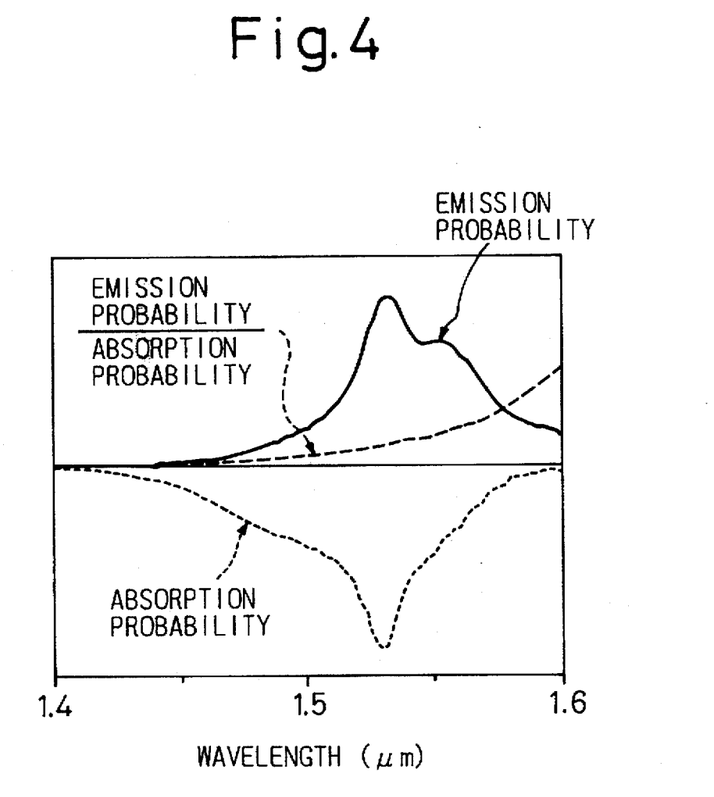
FIG. 4 is a graph showing the emission probability and absorption probability to erbium atoms in an erbium-doped fiber, and the ratio of the emission probability to the absorption probability as a function of wavelength.

FIG. 4 shows an emission probability (the probability of emission transition) and absorption probability (the probability of absorption transition) for an erbium-doped fiber, and the ratio of the emission probability to the absorption probability as a function of wavelength. As is shown in FIG. 4, emission just occurs at 1.48 μm (1480 nm) and the excitation ratio (the ratio of erbium atoms in excited state) is decreasing. However, since the emission ratio is low, light at this wavelength is not amplified. It is shown, however, that at longer wavelengths the emission ratio increases, with the excitation ratio further decreasing.

Figure 5:
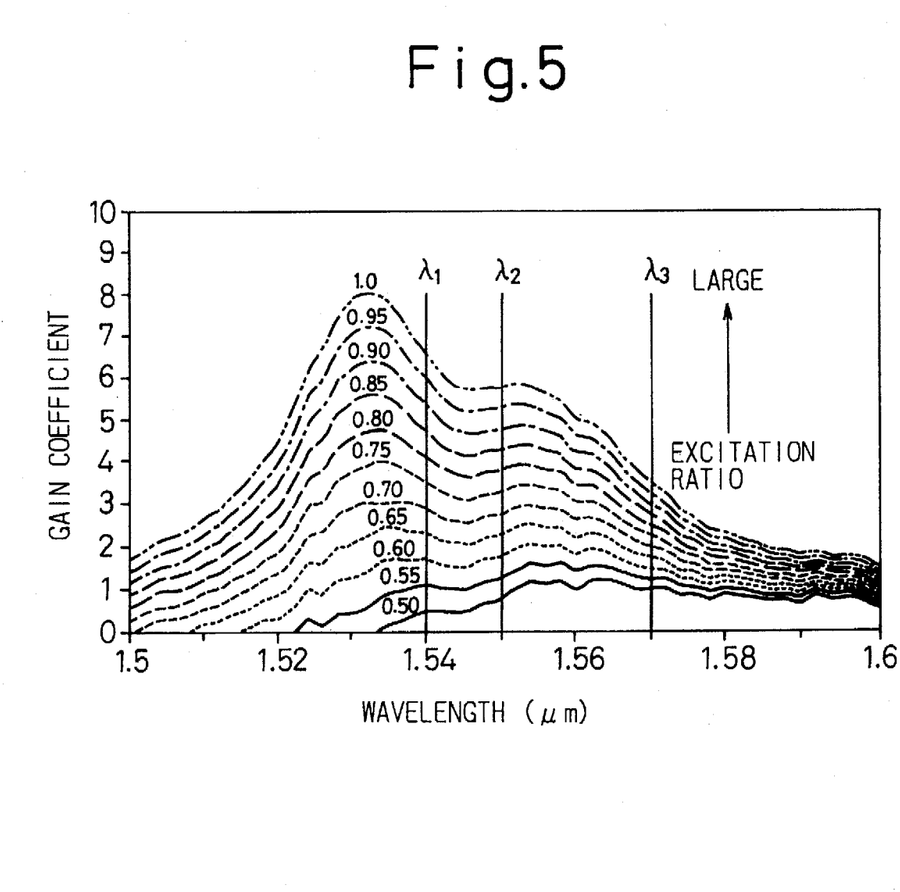
FIG. 5 is a graph showing the wavelength dependence of gain coefficient for various excitation ratios.

FIG. 5 is a graph showing how the wavelength dependence of gain coefficient changes for various excitation ratios. It can be seen from FIG. 5 that at excitation ratios closer to 1.0 the gain is relatively large at the shorter wavelength (for example, $\lambda_1$=1.54 μm), the gain becoming relatively large at the longer wavelength (for example, $\lambda_1$=1.55 μm) as the excitation ratio decreases.

From the above, it can be deduced that control of the gain difference was possible with the 0.98-μm/1.48-μm hybrid pumping because emission occurs at 1.48 μm, causing the excitation ratio to decrease. However, it can also be seen that as long as a wavelength band, such as 1.48 μm, which is not amplified in an erbium-doped fiber, is used, there is a limit to the decrease of the excitation ratio, limiting the control range.

Accordingly, in a second embodiment of the present invention, light at a wavelength falling within the operating wavelength band of a rare-earth-doped fiber is used as control light, the wavelength preferably being in a wavelength region where the emission probability is greater than the absorption probability, and more preferably not shorter than 1520 nm, and by controlling the optical power or wavelength of this control light, the excitation ratio is controlled, thereby controlling gain differences between signals.

Figure 6:
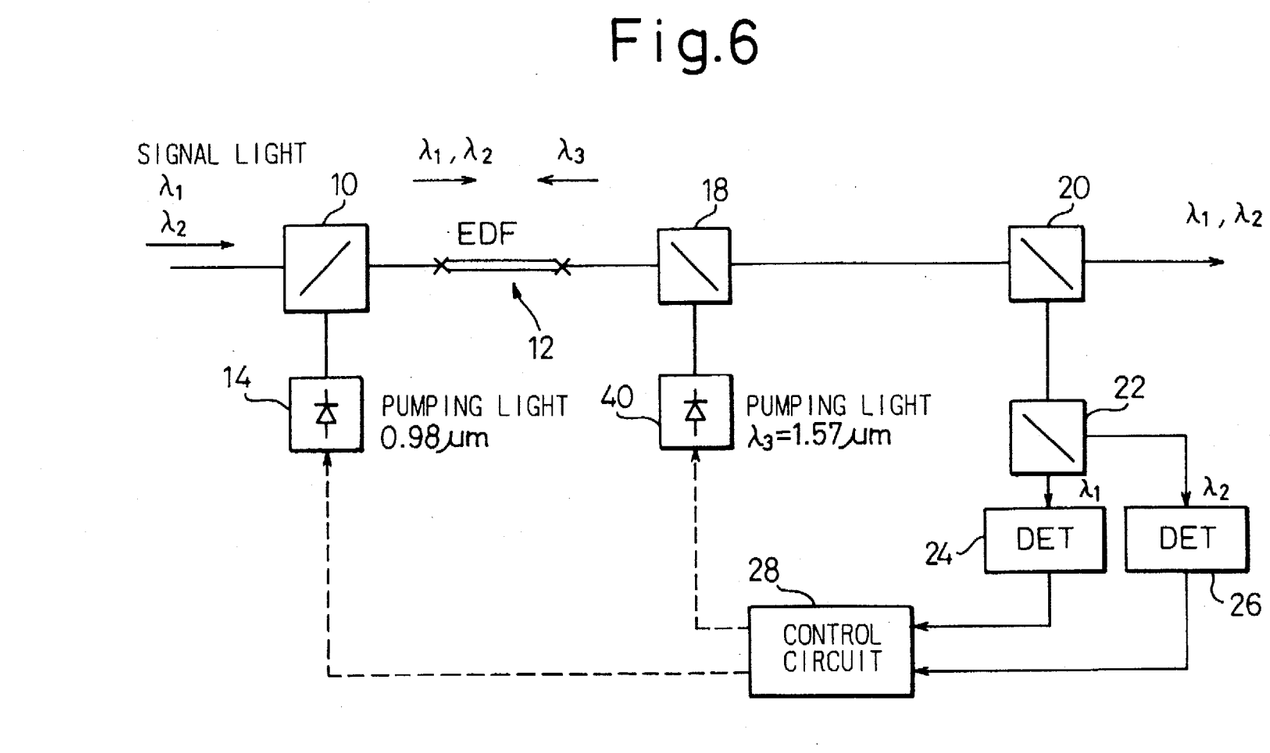
FIG. 6 is a block diagram showing a second embodiment of the present invention.

FIG. 6 shows the configuration of an optical amplifier to which control according to the second embodiment of the invention is applied. In FIG. 6, signal light consisting of two different wavelengths, $\lambda_1$ and $\lambda_2$ (for example, $\lambda_1$=1.54 μm and $\lambda_2$=1.55 μm, as shown in FIG. 5), is combined in a beam combiner 10 with pumping light (for example, 0.98 μm wavelength light) from a light source 14, and enters an erbium-doped fiber 12. Control light from a light source 40 emitting at wavelength $\lambda_3$ (for example, $\lambda_3$=1.57 μm, as shown in FIG. 5) is introduced, by a beam combiner 18, into the erbium-doped fiber 12 in the direction opposite to the direction of the signal light. Some of the signal light amplified through the erbium-doped fiber 12 is separated by an optical coupler 20 and enters a beam splitter 22 where the light is split into wavelengths $\lambda_1$ and $\lambda_2$, whose optical powers are detected by photodetectors 24 and 26, respectively. Based on the detection outputs from the photodetectors 24 and 26, a control circuit 28 controls the optical power or emitting wavelength of the light source 40 to control the gain difference, and controls the optical power of the light source 14 to control the overall (average) gain. In this manner, the output levels of the signal wavelengths $\lambda_1$ and $\lambda_2$ can be controlled at constant values.

It will be appreciated that the injection directions of the pumping light and control light are not limited to those shown in the illustrated example. Further, if it is required to remove the control light $\lambda_3$, an optical filter for removing the control light can be provided at the output. Controlling the optical power of the control light can be accomplished, for example, by controlling the drive current to a laser diode used as the light source 40. If the wavelength of the control light is to be controlled, a variable-wavelength laser, for example, is used as the light source 40.

Figure 7:
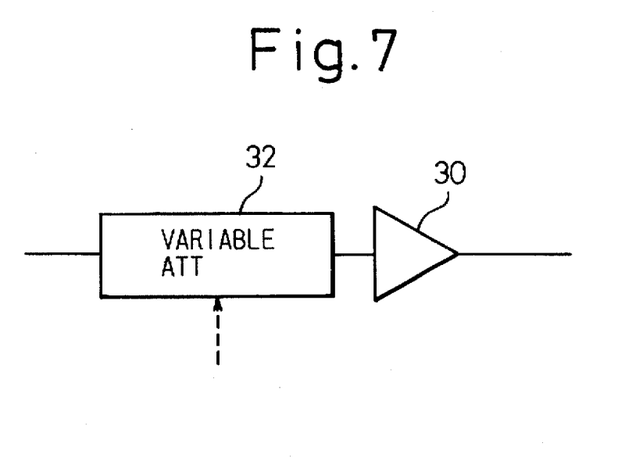
FIG. 7 is a block diagram showing a modified example of the second embodiment of the present invention.
Figure 8:
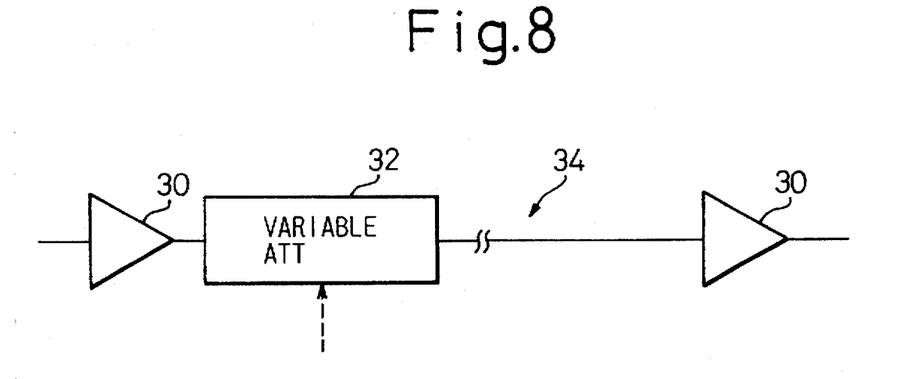
FIG. 8 is a block diagram showing another modified example of the second embodiment of the present invention.

Instead of introducing control light separate from the signal light, the gain difference between the signals can be controlled by controlling the power of signal light input to an optical amplifier 30 containing an erbium-doped fiber by using a variable attenuator 32, as shown in FIG. 7. Since signal light is always set at a wavelength where a certain degree of emission probability is obtained, the gain difference can also be controlled by controlling the incident power of the signal light itself. Alternatively, as shown in FIG. 8, the power of the signal light entering an optical amplifier 30 provided at the receiving end of an optical transmission path 34 may be controlled by using a variable attenuator 32 provided at the transmitting end.

Furthermore, in FIG. 6, it is possible to transmit the control light together with the signal light of $\lambda_1$ and $\lambda_2$ by modulating the control light with a supervisory (SV) signal used to supervise the transmission path. In this case, it is desirable that the control light be introduced into the erbium-doped fiber in the same direction as the direction of the signal light.

We claim:

1. A method of controlling an optical amplifier including a rare-earth-doped fiber for optically amplifying a wavelength-division multiplexed signal carrying a plurality of optical signals at respective, different wavelengths, comprising the steps of:

injecting first pumping light into the rare-earth-doped fiber;

injecting second pumping light into the rare-earth-doped fiber, the second pumping light giving a gain characteristic to the rare-earth-doped fiber different from a gain characteristic given thereto by the first pumping light gives; and controlling respective injection power of the first and the second pumping lights.

2. A method according to claim 1, further comprising:

a step of detecting respective powers of the plurality of optical signals at an output of the optical amplifier; and in the controlling step, controlling the respective injection powers of the first and second pumping lights in accordance with the respective, detected optical signal powers.

3. A method according to claim 2, further comprising, in the controlling step, controlling the respective injection powers of the first and second pumping lights by controlling respective drive currents to the light sources of the first and the second pumping lights.

4. A method according to claim 2, further comprising, in the controlling step, controlling the respective injection powers of the first and the second pumping lights by controlling first and second variable optical attenuators provided between the rare-earth-doped fiber and corresponding light sources of the first and the second pumping lights, respectively.

5. A method of controlling an optical amplifier including a rare-earth-doped fiber for optically amplifying a wavelength-division multiplexed signal carrying a plurality of optical signals at different wavelengths, comprising the steps of:

injecting control light into the rare-earth-doped fiber, the control light being at a wavelength within a wavelength region in which the rare-earth-doped fiber exhibits an optical amplification effect;

injecting pumping light into the rare-earth-doped fiber; and controlling injection power or wavelength of the control light and injection power of the pumping light, thereby controlling a gain difference between the plurality of optical signals and an overall gain of the optical signals, respectively.

6. A method according to claim 5, wherein the wavelength of the control light is different from each of the respective wavelengths of the plurality of optical signals.

7. A method according to claim 6, wherein the wavelength of the control light falls within a wavelength range in which an emission probability in the rare-earth-doped fiber is greater than an absorption probability therein.

8. A method according to claim 7, wherein the rare-earth-doped fiber is an erbium-doped fiber, and the wavelength of the control light is equal to or greater than 1520 nm.

9. A method according to claim 8, wherein the respective wavelengths of the plurality of optical signals are within a range from 1530 to 1565 nm, and the wavelength of the control light is equal to or greater than 1565 nm.

10. A method according to claim 6, further comprising a step of removing the control signal at an output of the optical amplifier.

11. A method according to claim 6, wherein the control light is modulated with a supervisory signal used to supervise a transmission channel.

12. A method according to claim 5, wherein the control signal is the wavelength-division multiplexed signal itself.

13. A method according to claim 5, further comprising a step of detecting respective powers of the plurality of optical signals at an output of the optical amplifier, wherein, in the controlling step, the injection power or wavelength of the control light is controlled in accordance with the detected, respective optical signal powers.

14. An apparatus for controlling an optical amplifier including a rare-earth-doped fiber for optically amplifying a wavelength-division multiplexed signal carrying a plurality of optical signals at respective different wavelengths, comprising:

a first optical coupler injecting first pumping light into the rare-earth-doped fiber;

a second optical coupler injecting second pumping light into the rare-earth-doped fiber, the second pumping light giving a gain characteristic to the rare-earth-doped fiber different from a gain characteristic given thereto by the first pumping light; and a control circuit controlling respective injection powers of the first and the second pumping lights.

15. An apparatus according to claim 14, further comprising means for detecting the respective powers of the plurality of optical signals at an output of the optical amplifier, wherein the control circuit controls the respective injection powers of the first and the second pumping lights in accordance with the respective, detected optical signal powers.

16. An apparatus according to claim 15, wherein the control circuit controls the injection powers of the first and the second pumping lights by controlling respective drive currents supplied to corresponding light sources of the first and the second pumping lights.

17. An apparatus according to claim 15, wherein the control circuit controls the respective injection powers of the first and the second pumping lights by controlling a variable optical attenuator provided between the rare-earth-doped fiber and each of first and second light sources of the first and the second pumping lights, respectively.

18. An apparatus for controlling an optical amplifier including a rare-earth-doped fiber for optically amplifying a wavelength-division multiplexed signal carrying a plurality of optical signals at respective, different wavelengths, comprising:

an optical coupler injecting control light into the rare-earth-doped fiber, the control light being at a wavelength within a wavelength range in which the rare-earth-doped fiber exhibits an optical amplification effect; and a control circuit controlling injection power or wavelength of the control light, thereby controlling a gain difference between the plurality of optical signals.

19. An apparatus according to claim 18, wherein the wavelength of the control light is different from each of the respective wavelengths of the plurality of optical signals.

20. An apparatus according to claim 19, wherein the wavelength of the control light falls within a wavelength range in which an emission probability in the rare-earth-doped fiber is greater than an absorption probability therein.

21. An apparatus according to claim 20, wherein the rare-earth-doped fiber is an erbium-doped fiber and the wavelength of the control light is equal to or greater than 1520 nm.

22. An apparatus according to claim 21, wherein the respective wavelengths of the plurality of optical signals are within a range from 1530 to 1565 nm and the wavelength of the control light is equal to or greater than 1565 nm.

23. An apparatus according to claim 19, further comprising means for removing the control signal at an output of the optical amplifier.

24. An apparatus according to claim 19, wherein the control light is modulated with a supervisory signal used to supervise a transmission channel.

25. An apparatus according to claim 18, wherein the control signal is the wavelength-division multiplexed signal itself.

26. An apparatus according to claim 18, further comprising means for detecting the respective powers of the plurality of optical signals at an output of the optical amplifier, wherein the control circuit controls the injection power or wavelength of the control light in accordance with the detected, respective optical signal powers.

* * * * *